UNITED STATES PATENT OFFICE.

HAROLD ALVIN LEVEY, OF NEW ORLEANS, LOUISIANA.

PLASTIC COMPOSITION AND METHOD OF PREPARING THE SAME.

1,295,533.                Specification of Letters Patent.      Patented Feb. 25, 1919.

No Drawing.        Application filed April 10, 1917. Serial No. 160,957.

*To all whom it may concern:*

Be it known that I, HAROLD ALVIN LEVEY, a citizen of the United States, residing at New Orleans, in the parish of Orleans and State of Louisiana, have invented a new and useful Improvement in Plastic Compositions and Methods of Preparing the Same, of which the following is a specification.

My present invention relates to improvements in plastic compositions and methods of preparing the same and is particularly concerned with a composition in which China wood oil is employed as a softening and toughening agent, the composition being subjected to such treatment as to effect the polymerization of the oil therein.

I have discovered that a plastic composition of this nature is particularly useful and desirable in that it possesses to a high degree the properties of flexibility, toughness, elasticity, strength and transparency, and relative ease of stripping or separating from the surface on which it is hardened. This combination of properties renders the composition especially suitable for the manufacture of sheets, films, filaments and the like. To the above-mentioned desirable qualities that of relative non-inflammability may be added if the composition consists substantially of a fatty ester of cellulose, such as the cellulose acetates, only a relatively small proportion of the cellulose nitrates being employed, this proportion being sufficient to hold in solution the China wood oil and prevent turbidity, both in the liquid and solid states. By heating such a composition at a temperature sufficient to polymerize the China wood oil, the strength, elasticity, toughness, and flexibility of the filament, film, or sheet, is enhanced.

A preferred composition according to my invention may be prepared as follows:

To 85 parts of a (partially) hydrated cellulose acetate add 12 parts of cellulose nitrate and 3 parts of China wood oil, the whole being dissolved in a mixture of 700 parts of acetic acid and 300 parts of acetone. This mixture may be dried at a temperature of approximately 100° C., under which conditions the China wood oil will be partially oxidized and polymerized.

The drying or hardening of a film or sheet of a thickness of approximately one-thousandth of an inch in thickness is found to take place in approximately four minutes at the temperature of 100° C. mentioned. By increasing the time proportionately lower temperatures may be employed and it is quite possible to dry or harden at ordinary room temperatures, although the time required is greatly increased. The polymerization as well as the oxidation are accelerated not only by the higher temperatures, which are preferred, but by the action of sunlight or artificial light reached in ultra violet rays. The resultant product will give evidence of increased flexibility, elasticity, toughness and strength, it will be perfectly transparent, and by reason of the small proportion of cellulose nitrates employed will also be of the order of inflammability of ordinary paper.

By the term "China wood oil" as used in the foregoing I intend to define the product known also under the trade-names of Japanese wood oil and tung oil.

While in the foregoing specification I have particularly described the exact method of carrying out the invention, and the preferred porportions of the parts, as well as the chemical theories which I believe to underlie the improved results which I obtain, it will be understood that the invention is not limited to these details nor dependent upon the soundness or accuracy of the chemical theories stated, except in so far as such limitations are included within the terms of the accompanying claims in which it is my intention to claim all novelty inherent in my invention, as broadly as is permissible in view of the prior art.

What I claim as new and desire to secure by Letters Patent is:

1. The improvement in the art of preparing plastic compositions containing cellulose nitrates which consists in adding to the said compositions China wood oil, and drying or hardening at a temperature sufficient to partially oxidize and polymerize the China wood oil.

2. The improvement in the art of preparing plastic compositions containing cellulose nitrates which consists in adding to the said compositions China wood oil, and drying or hardening at a temperature of approximately 100° C.

3. The improvement in the art of preparing plastic compositions from cellulose derivatives which consists in dissolving therein China wood oil, and drying or hardening the product at a temperature sufficient to partially oxidize and polymerize the said oil.

4. The improvement in the art of preparing plastic compositions from the fatty esters of cellulose which consists in incorporating into the said fatty esters China wood oil carried in solution in cellulose nitrates.

5. The improvement in the art of preparing plastic compositions from the fatty esters of cellulose which consists in incorporating into the said fatty esters China wood oil carried in cellulose nitrates, and drying or hardening at a temperature sufficient to partially oxidize and polymerize the said oil.

6. The improvement in the art of preparing plastic compositions from cellulose acetates which consists in incorporating into the said acetates China wood oil carried in solution in cellulose nitrates.

7. The improvement in the art of preparing plastic compositions from hydrated cellulose acetates which consists in incorporating into the said acetates China wood oil carried in solution in cellulose nitrates.

8. The improvement in the art of preparing plastic compositions from hydrated cellulose acetates which consists in incorporating into the said acetates China wood oil carried in cellulose nitrates, and drying or hardening in air at a temperature of approximately 100° C.

9. A plastic composition comprising a cellulose derivative and partially oxidized and polymerized China wood oil.

10. A plastic composition comprising a fatty ester of cellulose, cellulose nitrates, and China wood oil.

11. A plastic composition comprising a fatty ester of cellulose, cellulose nitrates, and partially oxidized and polymerized China wood oil.

12. A plastic composition containing cellulose nitrates and partially oxidized and polymerized China wood oil.

13. A plastic composition comprising cellulose acetates, cellulose nitrates, and partially oxidized and polymerized China wood oil.

14. A plastic composition comprising 85 parts cellulose acetates, 12 parts cellulose nitrates, and 3 parts China wood oil.

15. A plastic composition comprising 85 parts cellulose acetates, 12 parts cellulose nitrates, and 3 parts partially oxidized and polymerized China wood oil.

HAROLD ALVIN LEVEY.